United States Patent [19]

Hattori et al.

[11] 4,413,098

[45] Nov. 1, 1983

[54] ISOPRENE-BUTADIENE COPOLYMER RUBBER HAVING IMPROVED PROCESSING PROPERTIES

[75] Inventors: Yasuo Hattori; Takeshi Ikematu, both of Yokohama; Toshio Ibaragi, Kawasaki; Makoto Honda, Tokyo, all of Japan

[73] Assignee: Asahi Kasei Kogyo Kabushiki Kaisha, Osaka, Japan

[21] Appl. No.: 302,787

[22] Filed: Sep. 16, 1981

Related U.S. Application Data

[63] Continuation of Ser. No. 61,248, Jul. 27, 1979, abandoned.

[30] Foreign Application Priority Data

Aug. 18, 1978 [JP] Japan ................................ 53-100006

[51] Int. Cl.$^3$ .................. C08F 297/04; C08F 236/08; C08F 236/10
[52] U.S. Cl. ................................. 525/314; 525/332.7; 526/173; 526/177; 526/183; 526/337
[58] Field of Search ............... 526/173, 177, 337, 183; 525/314

[56] References Cited

U.S. PATENT DOCUMENTS 3,992,561 11/1976 Hargis et al. ...................... 526/337
4,048,427 9/1977 Hargis et al. ...................... 526/337
4,080,492 3/1978 DeZarauz ......................... 526/337

FOREIGN PATENT DOCUMENTS 1525381 9/1978 United Kingdom .

*Primary Examiner*—Stanford M. Levin
*Attorney, Agent, or Firm*—Birch, Stewart, Kolasch & Birch

[57] ABSTRACT

An isoprene-butadiene copolymer rubber having improved processing properties which comprises a microstructure of the butadiene portion having from 70% to 90% of trans-1,4 linkage and from 2% to 8% of vinyl linkage, an isoprene content of from 3 to 25 wt %, and a styrene content of from 0 to 30 wt %, said copolymer rubber having a Mooney Viscosity of from 30 to 150, and a molecular weight distribution, Mw/Mn of from 1.2 to 3.5, said rubber, in the unelongated state, not showing a melting point measured by the differential calorimeter analysis method. The copolymer rubber of the present invention can be used for tires, for example, a tread and a carcass or for other rubber uses.

4 Claims, No Drawings

ISOPRENE-BUTADIENE COPOLYMER RUBBER HAVING IMPROVED PROCESSING PROPERTIES

This application is a continuation, copending application Ser. No. 61,248, filed on July 27, 1979, now abandoned.

BACKGROUND AND SUMMARY OF THE INVENTION

The present invention relates to an isoprene-butadiene copolymer rubber having improved processing properties.

Methods for producing a butadiene polymer or a styrene-butadiene copolymer having a high content of 1,4-trans linkage are already known in the art. These polymers can be produced by solution polymerization in the presence of a complex initiator comprising as the main components (1) an organic compound of a metal from Group IIA and (2) another organic compound of a metal. [See U.S. Pat. No. 4,080,492 and B.P. 1,525,381.] According to the description in these patents, the distinctive feature of the polybutadiene polymer and the styrene-butadiene copolymer having a high content of trans-1,4 linkage obtained by such polymerization methods is a high green strength, and these polymers are said to exhibit the same high green strength and elongation as natural rubber.

These polymers have the excellent features of possessing high green strength but, on the other hand, possess such defects as having a poor tackiness and bad mill behavior. One of the ways to remove such defects is to widen the molecular weight distribution of the polymers by certain methods. [See Japanese Patent Application O.P.I. 52-9090, or its U.S. counterpart, U.S. Pat. No. 3,992,561.] However, in this case, defects are introduced by widening the molecular weight distribution, that is, a deterioration of the rubber elasticity, especially the resilience thereof can be seen. In an effort to overcome the above-described defects, it has been discovered that by using an isoprene as a portion of the monomer for copolymerization, the tackiness and the processing properties of the polymer can be improved, while the molecular weight distribution of the polymer is kept comparatively narrower.

SUMMARY OF THE INVENTION

It is, therefore, an object of the present invention to provide a novel synthetic rubber having excellent tackiness and sufficient rubber elasticity while retaining a high green strength.

Accordingly, the present invention is to provide an isoprene-butadiene copolymer rubber having improved processing properties which possess the following features:

(1) a microstructure of the butadiene portion of the rubber having in its microstructure from 70% to 90% of trans-1,4 linkage and from 2% to 8% of vinyl linkage, (2) an isoprene content of from 3 to 25 wt %, (3) a styrene content of from 0 to 30 wt %, (4) a Mooney Viscosity of from 30 to 150, (5) a molecular weight distribution Mw/Mn of from 1.2 to 3.5, and (6) the rubber in the unelongated state not showing a melting point measured by the differential scanning calorimeter analysis method.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The microstructure of the butadiene portion of the isoprene-butadiene copolymer rubber according to the present invention comprises from 70% to 90% of trans-1,4 linkage and from 2% to 8% of vinyl linkage. When the microstructure has a content of less than 70% of the trans 1,4-linkage, sufficient green strength of the rubber cannot be achieved, and when it has a content of greater than 90% of the trans 1,4-linkage, production of the rubber becomes difficult. Furthermore, the content of the vinyl linkage is generally preferred to be low from the standpoint of the dynamic characteristics of the vulcanized rubber, for example, the resilience and the abrasion resistance thereof, etc.

The isoprene content of the rubber according to the present invention is preferably from 3 to 25 wt %. When the isoprene content is less than 3%, the object of the present invention to improve the processing properties is not accomplished, and when the content is more than 25%, the effect of the high content of trans 1,4-linkage of the butadiene portion becomes small and the green strength of the rubber decreases.

The styrene content of the rubber, according to the present invention, is from 0 to 30 wt %. Even though the employment of no styrene does not adversely effect the present invention, the employment of styrene in the above-described range is preferred depending upon the uses of the present invention, for example, when a high strength of the vulcanized rubber is desired. The content of the styrene is not to be more than 30 wt %, preferably not more than 15 wt %, in order to achieve the high green strength of the rubber which is one of the main purposes of the present invention.

Advantageously, the preferable range of the styrene content is regulated by the isoprene content. That is, the total amount of the isoprene content and the styrene content is preferred to be not more than 25 wt %.

The Mooney viscosity of the rubber according to the present invention is from 30 to 150. When the Mooney viscosity is less than 30, the tensile strength of vulcanized rubber is undersirably low. On the other hand, when the Mooney viscosity is more than 150, the processing property, for instance, the dispersing property of fillers is not good, and the physical properties of vulcanized rubber thus obtained becomes undersirably inferior.

The molecular weight distribution Mw/Mn according to the present invention is in the range of from 1.2 to 3.5. Generally, a rubber having a molecular weight distribution less than 1.2 is difficult to produce, and when the molecular weight distribution Mw/Mn is more than 3.5, the decrease in the rubber elasticity is very large.

According to the present invention, the rubber in an unelongated state does not show the melting point measured by the differential scanning calorimeter analysis method. The partial crystallization of the copolymer rubber in the unelongated state needs a comparatively high temperature during the processing thereof. Thus, this brings about a hardness and a little tackiness in the rubber compound and the undesirable phenomenon of heat buildup, even on the properties of the vulcanized rubber.

The copolymer rubber of the present invention is obtained by solution copolymerization in an organic solvent.

As an initiator for the copolymerization, there may be used a complex initiator comprising as the main components, (1) an organic compound of a metal from Group IIA of the Periodic Table and (2) a compound selected from the group consisting of an organolithium, a mixture of an organolithium and an organoaluminum, and an organomagnesium.

Also, there may be used as a complex initiator a material comprising (1) an organic compound of barium and (2) an organolithiummagnesium compound or an organolithiumberyllium compound, the use of which provides a good yield for this polymerization reaction.

The copolymerization is carried out at a temperature ranging from 0° C. to 200° C., preferably from 30° C. to 150° C. in an inert atmosphere such as argon and nitrogen.

Isoprene and butadiene may be block copolymerized or randomly copolymerized.

The organic compound of a metal from Group IIA of the Periodic Table which can be used according to the present invention is represented by the following formulae:

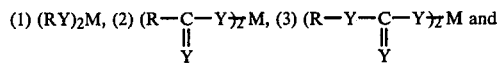

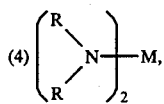

wherein R is a radical selected from the group consisting of aliphatic, alicyclic and aromatic hydrocarbons; Y is an oxygen atom or a sulfur atom; and M is barium, strontium or calcium.

Examples of such compounds are barium, strontium or calcium salts of the following compounds. Ethyl alcohol, n-propyl alcohol, isopropyl alcohol, tert-butyl alcohol, n-hexyl alcohol, cyclohexyl alcohol, allyl alcohol, cyclopentenyl alcohol, benzyl alcohol, phenol, catechol, 1-naphthol, 2,6-di-tert-butylphenol, 2,4,6-tri-tert-butylphenol, nonylphenol, 4-phenylphenol, ethanethiol, 1-butanethiol, thiophenol, cyclohexanethiol, 2-naphthalenethiol, capric acid, lauric acid, myristic acid, palmitic acid, stearic acid, oleic acid, linolic acid, linoleic acid, naphthoic acid, benzoic acid, hexanethionic acid, decanethionic acid, tridecanethionic acid, thiobenzoic acid, acid tert-butyl carbonate, acid hexyl carbonate, acid phenyl carbonate, acid thio tert-butyl carbonate, dimethylamine, diethylamine, di-n-butylamine, etc.

The organolithium compound which can be used according to the present invention is represented by the following formula:

R(Li)$_n$ wherein R is a radical selected from the group consisting of aliphatic, alicyclic and aromatic hydrocarbons, and n is an integer of from 1 to 4.

Examples of such compounds are ethyllithium, n-propyllithium, isopropyllithium, n-butyllithium, sec-butyllithium, tert-butyllithium, n-amyllithium, n-hexyllithium, n-octyllithium, allyllithium, n-propenyllithium, isobutenyllithium, benzyllithium, phenyllithium, 1,1-diphenylmethyllithium, tetramethylene-dilithium, pentamethylene-dilithium, hexamethylene-dilithium, diphenylethylene-dilithium, tetraphenylethylene-dilithium, 1,5-dilithium-naphthalene, 1,4-dilithiocyclohexane, polybutadienyllithium, polyisoprenyllithium, polystyrenyllithium, etc.

The organoaluminum compound is represented by the following formula:

R$_{3-m}$AlX'$_m$ wherein R is a radical selected from the group consisting of aliphatic, alicyclic and aromatic hydrocarbons; X' is a hydrogen atom or a halogen atom and m is 0, 1 or 2.

Examples of such compounds are triethylaluminum, triisobutylaluminum, diethylaluminum chloride, diethylaluminum hydride, diisobutylaluminum chloride, diisobutylaluminum hydride, etc.

The organomagnesium compound is represented by the following formulae:

(1) R$_2$M' and (2) RM'X wherein R is a radical selected from the group consisting of aliphatic, alicyclic and aromatic hydrocarbons; X is a halogen atom; and M' is a magnesium atom.

Examples of such compounds are diethylmagnesium, di-n-propylmagnesium, di-isopropylmagnesium, di-n-butylmagnesium, di-sec-butylmagnesium, di-tert-butylmagnesium, di-n-propenylmagnesium, diphenylmagnesium, ethylmagnesium chloride, n-propylmagnesium chloride, isopropylmagnesium chloride, n-butylmagnesium chloride, n-butylmagnesium bromide, n-butylmagnesium iodide, tert-butylmagnesium chloride and phenylmagnesium chloride, etc.

The organolithiummagnesium compound and the organolithiumberyllium compound are represented by the following formulae:

(1) LiMgR$_3$, (2) Li$_2$MgR$_4$, (3) LiBeR$_3$ and (4) Li$_2$BeR$_4$ wherein R is a radical selected from the group consisting of aliphatic, alicyclic and aromatic hydrocarbons.

Examples of such compounds are lithiummagnesium tri-n-butyl, lithiummagnesium n-butyldiethyl, lithiumberyllium tri-n-butyl, lithiumberyllium n-butyldiethyl and the like.

The complex initiator is prepared by preforming or by mixing, in situ, materials from the above-described components at various ratios. Furthermore, various kinds of electron donative organic compounds may be added to the above-described complex initiator of the present invention.

The present invention comprises the isoprene-butadiene copolymer rubber obtained by copolymerizing isoprene and 1,4-butadiene in the presence of the complex initiator composed of the various kinds of catalyst components described above or the complex initiator comprising such catalyst components.

The organic solvent according to the present invention which may be usually used in preferably one which is selected from the group consisting of aliphatic, alicyclic and aromatic hydrocarbons. Examples of such solvents are n-hexane, n-heptane, cyclohexane, benzene, toluene, etc., and the mixture thereof. Furthermore, a small amount of an ether of any kind may be contained in the solvent.

The isoprene-butadiene copolymer rubber itself, or a mixture of the said copolymer rubber with other synthetic rubbers or natural rubbers, blended with various kinds of known compounds, can be used for tires, for example, a tread and a carcass or for other rubber uses.

The following examples are given herein as being exemplary of the present invention and, accordingly, should not be considered in any way as limiting the scope of the present invention.

EXAMPLE 1

A monomer mixture of 262 grams of butadiene and 58 grams of isoprene and a solvent of 1280 grams of n-hexane were charged into a 3 l reaction vessel containing dried nitrogen gas and, furthermore, an initiator of 0.3 mmol of barium dinonyl phenoxide and 0.6 mmol of lithiummagnesium tributyl was added. The temperature of the vessel was raised to 50° C., and the polymerization reaction was carried out for 7 hours. The reaction was stopped with 4 ml of methanol, and 0.3 part by weight of di-tert-butylhydroxytoluene, based on a hundred parts by weight of the copolymer, was added and the solvent was evaporated with the recovery of the copolymer. The analyzed results of the copolymer are shown in Table 1.

TABLE 1

| Polymer yield (%) | (1) Inherent viscosity | (2) Molecular weight distribution Mw/Mn | (3) Mooney Viscosity $ML_{1+4}$ (100° C.) | (4) Melting point (°C.) | (5) Butadiene content (%) |
|---|---|---|---|---|---|
| 92 | 2.10 | 1.46 | 59 | not observed | 85 |

| (6) Microstructure of the butadiene portion | | Isoprene content (%) | Microstructure of the isoprene portion | |
|---|---|---|---|---|
| 1,4-trans (%) | 1,2-vinyl (%) | | 1,4-trans (%) | 3,4-vinyl (%) |
| 76 | 7 | 15 | 25 | 7 |

Footnotes to Table 1:
(1) measured in toluene at 30° C.
(2) measured by G.P.C. (Gel permeation chromatography) method
(3) JIS K-6300
(4) measured by DSC (the differential scanning calorimeter) at a raising speed of 20° C. a minute
(5) each content is calculated from the analyzed value in gas chromatography of feed monomer and unreacted monomer
(6) measured by an infrared analysis method

EXAMPLE 2

Example 1 was repeated except that the monomer mixture was replaced by a mixture of 250 grams of butadiene, 54 grams of isoprene and 16 grams of styrene. The analyzed results of the copolymer obtained are shown in Table 2.

TABLE 2

| Polymer yield (%) | Inherent viscosity | Molecular weight distribution Mw/Mn | Mooney viscosity $ML_{1+4}$ (100° C.) | Melting point (°C.) | Butadiene content (%) |
|---|---|---|---|---|---|
| 90 | 2.02 | 1.53 | 54 | not observed | 81 |

| Microstructure of the butadiene portion | | Isoprene content (%) | Microstructure of the isoprene portion | | Styrene content (%) |
|---|---|---|---|---|---|
| 1,4-trans (%) | 1,2-vinyl (%) | | 1,4-trans (%) | 3,4-vinyl (%) | |

TABLE 2-continued

| 75 | 7 | 15 | 25 | 7 | 4 |

EXAMPLE 3

A monomer of 262 grams of butadiene and a solvent of 1280 grams of n-hexane were charged into a 3 l reaction vessel filled with dried nitrogen gas, and further an initiator of 0.30 mmol of barium dinonyl phenoxide, and 0.60 mmol of lithiummagnesium tributyl was added thereto. The polymerization reaction was carried out for 7 hrs. at 50° C. Then 58 grams of isoprene was added and the polymerization reaction was carried out for 7 hrs. at 50° C. After the polymerization reaction, the polymerization reaction was stopped in the same way as Example 1 and the polymer was then recovered. The analyzed results of the copolymer thus obtained are shown in Table 3.

TABLE 3

| Polymer yield (%) | Inherent viscosity | Molecular weight distribution Mw/Mn | Mooney viscosity $ML_{1+4}$ (100° C.) | Melting point (°C.) | Butadiene content (%) |
|---|---|---|---|---|---|
| 92 | 1.99 | 1.66 | 53 | not observed | 88 |

| Microstructure of the butadiene portion | | Isoprene content (%) | Microstructure of the isoprene portion | |
|---|---|---|---|---|
| 1,4-trans (%) | 1,2-vinyl (%) | | 1,4-trans (%) | 3,4-vinyl (%) |
| 75 | 2 | 12 | 25 | 7 |

EXAMPLE 4

Example 1 was repeated except that the initiator was replaced by an initator comprising 0.30 mmol of barium dinonyl phenoxide, 0.60 mmol of lithiummagnesium tributyl and 1.20 mmol of triethylaluminum. The analyzed results of the copolymer thus obtained are shown in Table 4.

TABLE 4

| Polymer yield (%) | Inherent viscosity | Molecular weight distribution Mw/Mn | Mooney viscosity $ML_{1+4}$ (100° C.) | Melting point (°C.) | Butadiene content (%) |
|---|---|---|---|---|---|
| 83 | 2.10 | 1.67 | 36 | not observed | 85 |

| Microstructure of the butadiene portion | | Isoprene content (%) | Microstructure of the isoprene portion | |
|---|---|---|---|---|
| 1,4-trans (%) | 1,2-vinyl (%) | | 1,4-trans (%) | 3,4-vinyl (%) |
| 85 | 3 | 15 | 40 | 8 |

EXAMPLE 5

Example 1 was repeated except that the initiator was replaced by an initiator comprising 0.30 mmol of barium dinonyl phenoxide and 0.60 mmol of magnesium dibutyl. The analyzed results of the copolymer thus obtained are shown in Table 5.

TABLE 5

| Polymer yield (%) | Inherent viscosity | Molecular weight distribution Mw/Mn | Mooney viscosity $ML_{1+4}$ (100° C.) | Melting point (°C.) | Butadiene content (%) |
|---|---|---|---|---|---|
| 85 | 1.89 | 1.53 | 47 | not | 86 |

TABLE 5-continued

| | observed | | | |
|---|---|---|---|---|
| Microstructure of the butadiene portion | | Isoprene content (%) | Microstructure of the isoprene portion | |
| 1,4-trans (%) | 1,2-vinyl (%) | | 1,4-trans (%) | 3,4-vinyl (%) |
| 75 | 8 | 14 | 23 | 7 |

COMPARATIVE EXAMPLE 1

Example 1 was repeated except that the monomer used was only a butadiene monomer. The analyzed results of the polymer obtained are shown in Table 6.

TABLE 6

| Polymer yield (%) | Inherent viscosity | Molecular weight distribution Mw/Mn | Mooney viscosity $ML_{1+4}$ (100° C.) | Melting point (°C.) | Butadiene content (%) |
|---|---|---|---|---|---|
| 93 | 2.11 | 1.38 | 52 | 32 | 100 |

| | Microstructure of the butadiene portion | |
|---|---|---|
| | 1,4-trans (%) | 1,2-vinyl (%) |
| | 76 | 7 |

COMPARATIVE EXAMPLE 2

Example 1 was repeated except that the monomer mixture was replaced by a mixture of 304 grams of butadiene and 16 grams of styrene. The analyzed results of the copolymer obtained are shown in Table 7.

TABLE 7

| Polymer yield (%) | Inherent viscosity | Molecular weight distribution Mw/Mn | Mooney viscosity $ML_{1+4}$ (100° C.) | Melting point (%) | Butadiene content (%) |
|---|---|---|---|---|---|
| 92 | 1.74 | 1.36 | 37 | 22 | 96 |

| Microstructure of the butadiene portion | | Styrene content (%) |
|---|---|---|
| 1,4-trans (%) | 1,2-vinyl (%) | |
| 76 | 7 | 4 |

COMPARATIVE EXAMPLE 3

Example 1 was repeated, maintaining the initiator components and the ratio of said components the same as Example 1, with the exception that the monomer utilized was only a butadiene monomer and the amount of the initiator was varied in three different amounts. Thus, three types of polybutadienes having inherent viscosities 0.34, 1.78, 2.85 respectively were obtained. By blending the above-mentioned polymers in a ratio of 2:3:5 respectively, a blend was obtained. The analyzed results of the blend are shown in Table 8.

TABLE 8

| Inherent viscosity | Molecular weight distribution Mw/Mn | Mooney viscosity $ML_{1+4}$ (100° C.) | Melting point (°C.) | Butadiene content (%) |
|---|---|---|---|---|
| 2.13 | 5.1 | 54 | 22 | 100 |

| | Microstructure of the butadiene portion | |
|---|---|---|
| | 1,4-trans (%) | 1,2-vinyl (%) |
| | 76 | 7 |

EXAMPLE 6

The polymers obtained in Examples 1 to 6 and Comparative Examples 1 to 3, respectively, were blended according to the composition shown in Table 9.

Further as Comparative Example 4, a butadiene-styrene copolymer rubber produced by emulsification polymerization (Cold SBR 1502) was used.

The evaluation of the properties of the compounds containing these polymers was recorded, with the results being shown in Table 10.

TABLE 9

| Compound Recipe | (parts by weight) |
|---|---|
| Polymer | 100 |
| Aromatic Oil[1] | 35 |
| Carbon Black HAF | 75 |
| Zinc Oxide | 6 |
| Stearic Acid | 3 |
| Antioxidant B[2] | 1.3 |
| Sulfur | 2 |
| Accelerator CZ[3] | 1.5 |

Footnotes for Table 9:
[1] an aromatic process oil having a specific gravity of 0.951 and a viscosity-gravity constant of 0.961
[2] a reaction product of diphenylamine with acetone
[3] N—cyclohexyl-benzothiazole sulfonic amide The evaluation of the processing properties of the compounds and the characteristic properties of the vulcanized rubber obtained by press-vulcanizing for 40 minutes at 141° C. was made and the results are shown in Table 10.

TABLE 10

| | | Experiment No. | | | | | | | | |
|---|---|---|---|---|---|---|---|---|---|---|
| Evaluation Article | | Example 1 | Example 2 | Example 3 | Example 4 | Example 5 | Comparative Example 1 | Comparative Example 2 | Comparative Example 3 | Comparative Example 4 Cold SBR-1502 |
| Physical Properties of Rubber Compound | Mill Behavior | excellent | excellent | excellent | excellent | excellent | bad | bad | excellent | excellent |
| | Mooney[1] Viscosity $ML_{1+4}$ (100° C.) | 75 | 72 | 70 | 75 | 65 | 77 | 63 | 70 | 61 |
| | Green Strength[2] (kg/cm$^2$) | 5.2 | 6.2 | 23.0 | 6.6 | 5.0 | 30.0 | 4.5 | 18.2 | 3.2 |
| | Green Elongation[2] (%) | 700 | 450 | 230 | 900 | 700 | 150 | 1100 | 200 | 330 |
| | Tackiness[3] (kg/cm$^2$) | 0.78 | 0.70 | 0.65 | 0.65 | 0.50 | 0 | 0.26 | 0.45 | 0.37 |
| Physical | Hardness[4] | | | | | | | | | |

TABLE 10-continued

| Evaluation Article | | Example 1 | Example 2 | Example 3 | Example 4 | Example 5 | Comparative Example 1 | Comparative Example 2 | Comparative Example 3 | Comparative Example 4 Cold SBR-1502 |
|---|---|---|---|---|---|---|---|---|---|---|
| Properties of Vulcanized Rubber | (JIS) 300% Modulus[4] (kg/cm$^2$) | 67 | 65 | 68 | 68 | 67 | 67 | 66 | 66 | 64 |
| | Tensile Strength[4] (kg/cm$^2$) | 94 | 99 | 96 | 100 | 93 | 86 | 100 | 77 | 116 |
| | Elongation[4] (%) | 185 | 235 | 211 | 205 | 180 | 231 | 246 | 162 | 240 |
| | Resilience[4] (%) | 480 | 560 | 540 | 510 | 470 | 590 | 580 | 630 | 600 |
| | Abrasion[5] Resistance (Index) | 50 | 47 | 51 | 52 | 50 | 50 | 48 | 46 | 38 |
| | Heat[6] Buildup ΔT(°C.) | 310 | 280 | 200 | 310 | 300 | 290 | 290 | 180 | 100 |
| | | 30 | 30 | 25 | 28 | 25 | 40 | 38 | 64 | 35 |

Footnotes for Table 10:
[1]JIS-K6300
[2]JIS No. 1 "Dumb-bell" is used at a tensioning speed of 500 mm/min.
[3]Monsanto Tackmeter is used
[4]JIS-K6301
[5]Pico abrasion testmeter is used ASTM D-2228
[6]Goodrich Flexometer is used ASTM D-623-58(A)

As is apparent from Table 10, the isoprene-butadiene copolymer rubbers of Examples 1 to 6 of the present invention do not exhibit, as compared with the Comparative Example 1 or 2, a decrease of the physical properties of vulcanized rubber as shown in Comparative Example 3.

Thus, the rubber of the present invention possesses a substantially improved tackiness property, while retaining a high green strength and, therefore, provides a very excellent raw rubber material having an advantageous balance of properties.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An isoprene-butadiene copolymer rubber having improved processing properties which comprises a microstructure of the butadiene portion having from 70% to 90% of trans-1,4 linkage and from 2% to 8% of vinyl linkage, an isoprene content of from 3 to 25 wt %, and a styrene content of from 0 to 30 wt %, said copolymer rubber having a Mooney Viscosity of from 30 to 150, and a molecular weight distribution, Mw/Mn of from 1.2 to 3.5, said rubber, in the unelongated state, not exhibiting a melting point measured by the differential scanning calorimeter analysis method.

2. The isoprene-butadiene copolymer rubber as claimed in claim 1, wherein the total content of isoprene and styrene is not more than 25 wt %.

3. The isoprene-butadiene copolymer rubber as claimed in claim 1 or 2, wherein the isoprene is substantially randomly copolymerized.

4. The isoprene-butadiene copolymer rubber as claimed in claim 1 or 2, wherein the isoprene is substantially block copolymerized.

* * * * *